(No Model.)
J. A. WILLIAMS.
MACHINE FOR CUTTING THE ENDS OF SPINDLES.
No. 482,934. Patented Sept. 20, 1892.
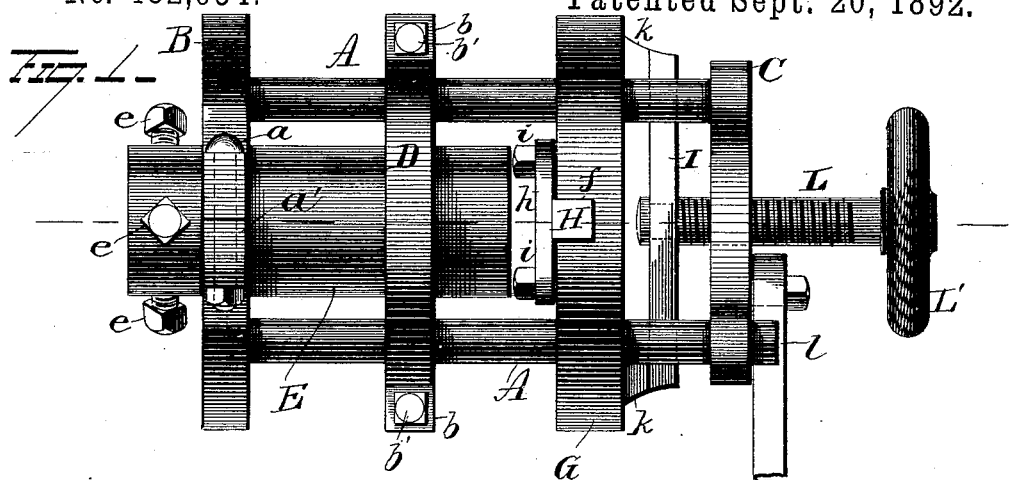
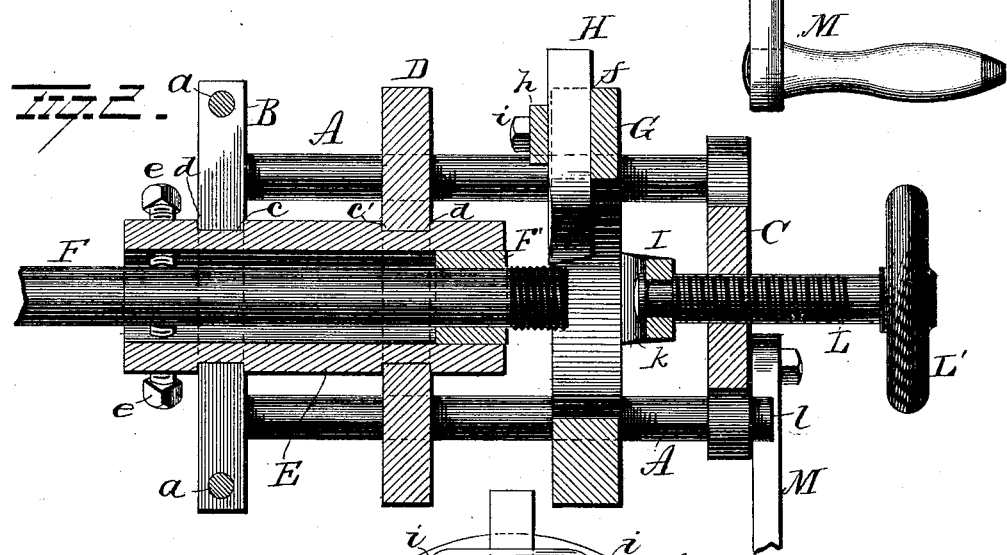
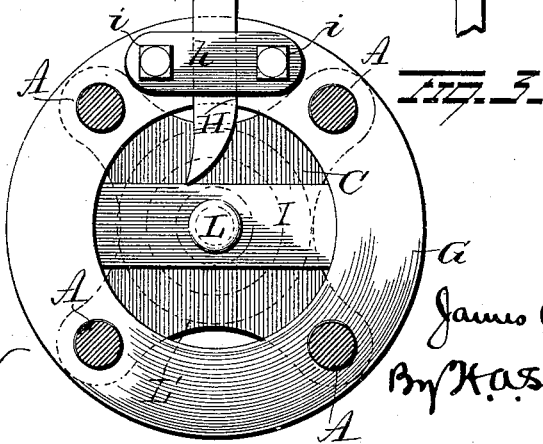

UNITED STATES PATENT OFFICE.

JAMES A. WILLIAMS, OF WALKERTON, INDIANA.

MACHINE FOR CUTTING THE ENDS OF SPINDLES.

SPECIFICATION forming part of Letters Patent No. 482,934, dated September 20, 1892.

Application filed February 1, 1892. Serial No. 419,954. (No model.)

*To all whom it may concern:*

Be it known that I, JAMES A. WILLIAMS, a resident of the town of Walkerton, in the county of St. Joseph and State of Indiana, have invented certain new and useful Improvements in Machines for Cutting the Ends of Spindles, &c.; and I do hereby declare the following to be a full, clear, and exact description of the invention, such as will enable others skilled in the art to which it appertains to make and use the same.

My invention relates to an improvement in cutting-machines, and more particularly to machines for cutting the ends of spindles, the object of the invention being to produce a simple and efficient machine for cutting the ends of spindles or stubs of buggies or other road-vehicles.

In the accompanying drawings, Figure 1 is an elevation of my improved cutter. Fig. 2 is a longitudinal sectional view. Fig. 3 is a transverse vertical sectional view.

A represents a series of rods or bars, to the ends of which disks B C are secured. The disk B is preferaby made in sections and secured together by means of bolts $a$, passing through shoulders $a'$, projecting from the sections of said disks. The disk C may conveniently be made star-shaped. Somewhat removed from the disk B is a sectional disk D, having ears or shoulders $b$, through which bolts $b'$ are passed for holding the sections of said disk together, the disk D being also made with perforations for the accommodation of the rods or bars A. The disks B D are provided at their centers with openings $c$ $c'$, respectively, for the accommodation of a sleeve E, which passes through both of said disks. Where the sleeve E passes through the disks B D, said sleeve is provided with grooves $d$, into which the disks enter, so that any longitudinal movement of the sleeve will be prevented. At one end of the sleeve a series of screws $e$ is provided said screws being adapted to hold a spindle F tight within the sleeve. The spindle F to be operated upon (which may in some cases be of smaller diameter than the opening in the sleeve E) is passed through said sleeve until the portion to be cut off projects beyond the inner end thereof, being properly centered by a ring or washer F', encircling the spindle and inserted in the end of the sleeve.

A ring or disk G is loosely mounted on the rods or bars A and adapted to slide thereon, said disk or ring G being provided with a recess $f$ for the reception of a knife or cutter H. The knife or cutter H is held in place by means of a plate $h$, which is secured to the disk or ring G by means of screws $i$. The disk or ring G carries a cross-bar I, said cross-bar being slightly removed from the disk or ring by means of washers or lugs $k$.

A screw L is swiveled to the center of the cross-bar I and passes through a screw-threaded perforation in the center of the star-shaped disk C, being provided at its free end with a hand-wheel L'. A handle M is connected to the star-disk C and is adapted to bear against a lug $l$ on said star-disk.

The apparatus, being constructed as above set forth, is operated as follows: The spindle to be cut is first marked in any suitable manner where it is desired to make the cut. The spindle is held stationary in any suitable manner and passed through the sleeve E until the forward end thereof projects beyond the inner end of said sleeve. The ring or washer F' is then placed on the spindle to center the same within the sleeve E. The spindle having been thus passed through the sleeve E is secured by the screws $e$. The disk or ring G, carrying the knife or cutter H, is now moved by means of the screw L until the knife or cutter is at the proper place where it is desired to cut the spindle, usually at the shoulder at the inner ends of the screw-threads. The knife or cutter is then driven into the spindle in any suitable manner, after which the entire machine, with the exception of the sleeve which holds the spindle, is turned by means of the handle M, which operation causes the knife or cutter to cut a groove in the spindle. The disk carrying the knife or cutter is then moved back to the end of the spindle by means of the screw L, and the knife is driven to the center of the spindle. The machine is then again turned and the end of the spindle will be cut off by the continued rotation of the machine until the groove or mark above mentioned is reached.

Having fully described my invention, what

I claim as new, and desire to secure by Letters Patent, is—

1. The combination, with a series of rods or bars, of a disk secured at each end of said series of rods or bars, a sleeve loosely mounted in one of said disks and adapted to hold a spindle or similar device, a ring mounted to slide on said rods or bars, a screw for sliding said ring, a cutter carried by said ring, and means for revolving the machine independently of the sleeve, substantially as and for the purpose set forth.

2. The combination, with a series of rods or bars, of a disk mounted at each end of said series of rods or bars, another disk mounted on said rods or bars adjacent to the disk at one end of the device, a sleeve mounted loosely in said adjacent disks in such manner as to be incapable of longitudinal movement, a ring mounted to slide on the rods or bars, a cutter carried by said ring, means for manipulating the latter, and means for rotating the machine independently of the loose sleeve, substantially as set forth.

3. The combination, with a series of rods or bars, of disks located at the ends of said rods or bars, the disk at one end being made in separable sections and secured together, another sectional disk mounted on said rods or bars adjacent to the first-mentioned sectional disk, a sleeve loosely mounted in said sectional disks in such a manner as to prevent longitudinal movement of said sleeve, a sliding ring, a cutter carried thereby, a cross-bar carried by said sliding ring, a screw swiveled in said cross-bar and passing through a screw-threaded opening in the disk at the inner end of the machine, and an operating-wheel carried by said screw, and a handle for rotating the machine independently of the sleeve, substantially as set forth.

In testimony whereof I have signed this specification in the presence of two subscribing witnesses.

JAMES A. WILLIAMS.

Witnesses:
CURTIS WOLFENBARGER,
WALTER T. ROGERS.